United States Patent [19]
Foster et al.

[11] Patent Number: 6,099,809
[45] Date of Patent: Aug. 8, 2000

[54] CATALYTIC CONVERTER HAVING A METAL FOIL SUBSTRATE

[75] Inventors: Michael Ralph Foster, Columbiaville; Gerald Leroy Vaneman, Grand Blanc, both of Mich.

[73] Assignee: General Motors Corporation, Detroit, Mich.

[21] Appl. No.: 09/144,481

[22] Filed: Aug. 31, 1998

[51] Int. Cl.⁷ .................................................. B01D 53/34
[52] U.S. Cl. ........................ 422/180; 422/177; 502/439; 502/527.19; 502/527.22
[58] Field of Search .................................. 422/171, 177, 422/174, 179, 180; 502/439, 527.19, 527.22; 60/299, 300

[56] References Cited

U.S. PATENT DOCUMENTS

| | | | |
|---|---|---|---|
| 4,152,302 | 5/1979 | Nonnenmann et al. | 252/472 |
| 4,382,323 | 5/1983 | Chapman et al. | 29/890 |
| 4,559,205 | 12/1985 | Hood | 422/180 |
| 4,576,800 | 3/1986 | Retallick | 422/180 |
| 4,619,912 | 10/1986 | Jalbing et al. | 502/439 |
| 4,673,553 | 6/1987 | Retallick | 422/180 |
| 4,731,229 | 3/1988 | Sperandio | 422/188 |
| 4,987,034 | 1/1991 | Hitachi et al. | 428/593 |
| 5,187,142 | 2/1993 | Richmond et al. | 502/439 |

*Primary Examiner*—Hien Tran
*Attorney, Agent, or Firm*—Vincent A. Cichosz

[57] ABSTRACT

A low profile catalytic converter for use with an internal combustion engine that has a canister provided with a plurality of smooth foil sections arranged in substantially perpendicular relationship with the top and bottom walls of the canister. The smooth foil sections are spaced from each other so as to form a plurality of substantially rectangular passages providing axially extending flow paths for the exhaust gas emanating from the engine. At least one corrugated foil strip is located in each of the passages and an arm is formed with each of the smooth foil sections that is secured together with a portion of the corrugated foil strip by separate welds to the top and bottom walls of the canister.

13 Claims, 4 Drawing Sheets

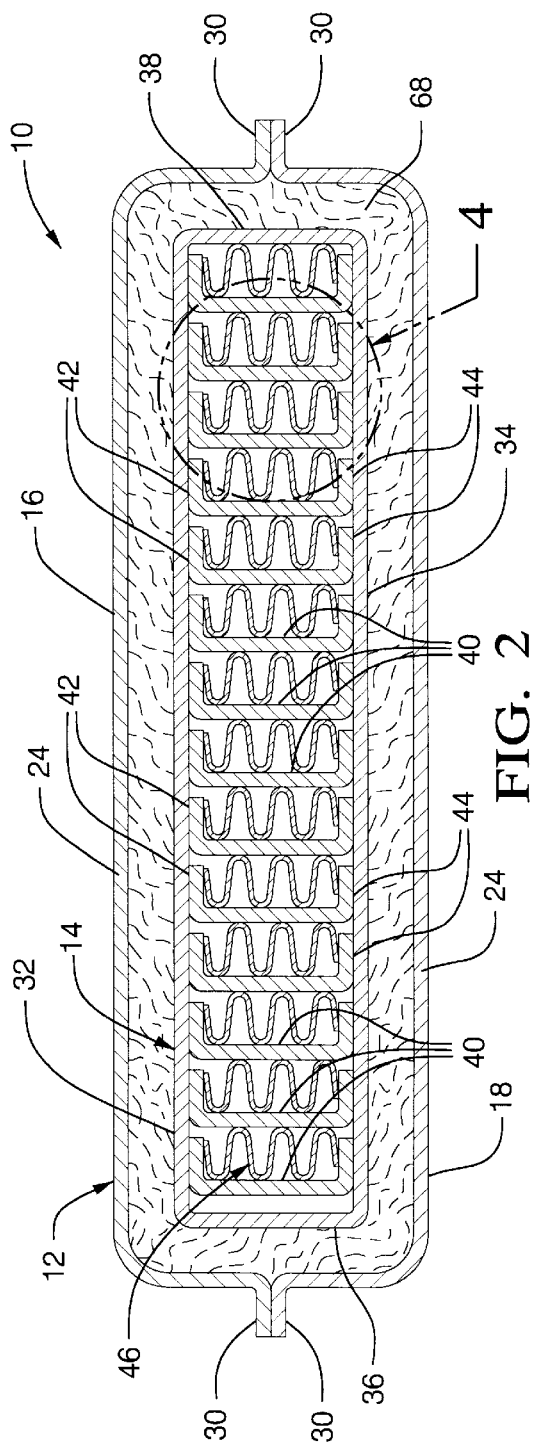
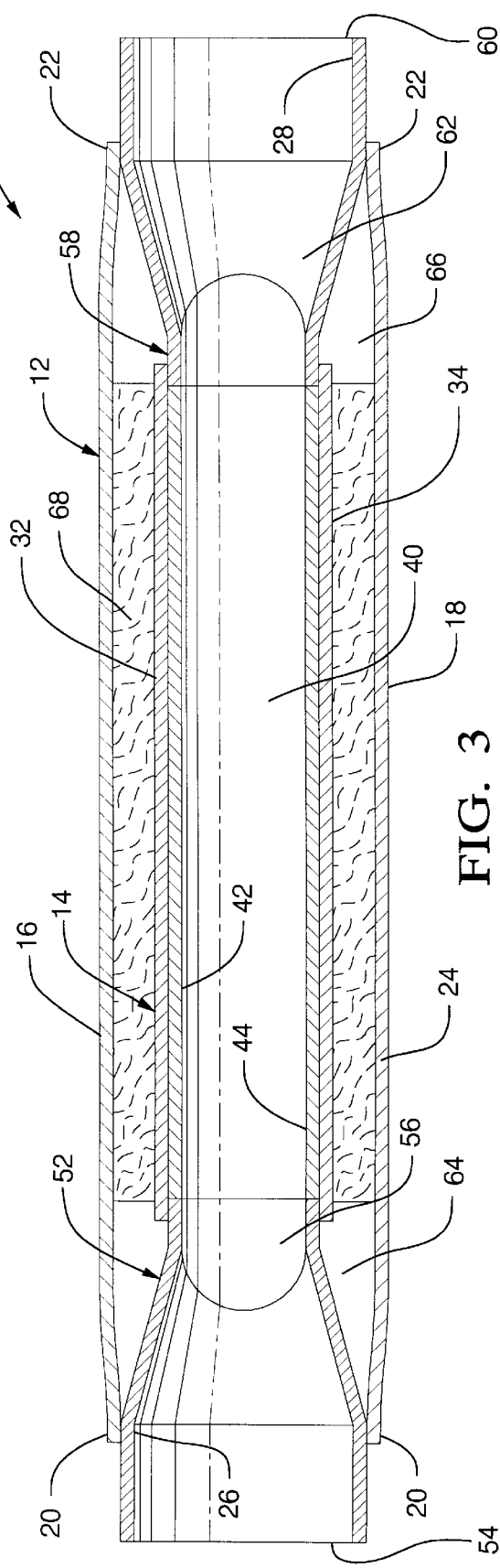

CATALYTIC CONVERTER HAVING A METAL FOIL SUBSTRATE

This invention concerns catalytic converters and more particularly relates to a catalytic converter for use with an internal combustion engine that has a metal substrate composed of smooth and corrugated foil strips coated with a catalyst for removing undesirable constituents in the exhaust gases of the engine.

BACKGROUND OF THE INVENTION

Various forms of metal honeycomb substrates for catalytic converters have been proposed in the past. For example, the U.S. Pat. No. 4,559,205, issued on Dec. 17, 1985, entitled "Catalytic Converter Substrate and Retainer Assembly" and assigned to the assignee of this invention discloses a catalytic converter substrate of curved cross-sectional profile comprising a stack of modules individually formed of folded metal foil having contacting layers defining passages therebetween. The modules have a uniform thickness but various widths so as to conform the stack to the desired profile but with the combined thickness of the modules being made oversize such that the contacting layers are frictionally held together against relative sliding when the modules are compressively loaded by a retainer to completely conform to the desired profile.

Another patent which is assigned to the assignee of the present invention and shows a converter with a catalyst coated metal honeycomb substrate is U.S. Pat. No. 4,619,912 issued on Oct. 28, 1986, and entitled "Catalytic Converter Substrate." This patent discloses a metal substrate formed of two smooth foil strips and one corrugated foil strip arranged and folded together so that alternate folds of each of the smooth foil strips have spaced sides and juxtaposed abutting sides and interleave with those of the other smooth foil strips. This allows all of the folds, of the corrugated foil strips to have spaced sides that sandwich the folds with juxtaposed abutting sides of both the smooth foil strips so as to define passages therebetween. In addition, all of the strips are adapted to be retained together against telescoping by engaging retaining means at the opposite ends of all of their folds.

Yet another U.S. patent that has issued to the assignee of this invention and discloses a metal foil substrate catalytic converter is U.S. Pat. No. 5,187,142, issued on Feb. 16, 1993, in the name of Richmond et al. The catalytic converter seen in this patent has corrugated metal foil sheets secured together in a stack so that a plurality of axially extending fluid flow paths are defined therebetween. Disposed at predetermined intervals throughout the stack are foil retainer sheets having integral foil tabs extending outwardly from the side edges and folded about the outer side surface of the substrate to form a segmented foil skin thereabout. The segmented foil skin may be welded continuously along its length to secure the foil sheets in a unitary catalyst substrate and to provide a weld surface for attachment of the catalyst substrate directly to the converter canister wall.

Also, the U.S. Pat. No. 4,731,229 entitled "Reactor and Packing Element For Catalyzed Chemical Reactions", issued on Mar. 15, 1988, in the name of August Sperandio covers a reactor for performing heterogeneous catalyzed chemical reactions. The reactor comprises packing elements which are constructed of corrugated plates having inclined corrugations and catalyst members which are disposed between the plates. In one embodiment, the catalyst members have alternating fluted parts and unfluted parts with the fluted parts disposed within the troughs of the adjacent corrugated plate. In other embodiments, the catalyst members may be in the form of unfluted members, continuously fluted members and members which are disposed in planes between pairs of corrugated plates or within the troughs of the corrugated plates.

There is also U.S. Pat. No. 4,673,553 entitled "Metal Honeycomb Catalyst Support Having a Double Taper", issued on Jun. 16, 1987, in the name of William B. Retallick. This patent shows a catalytic converter that includes a metal honeycomb catalyst support anchored in a canister so that it cannot telescope or blow out of the canister. The honeycomb catalyst support is made by folding a strip of metal back and forth upon itself. The lines of folding are inclined to the perpendicular to the axis of the strip of metal. The repeating sequence of the inclinations is left, right, right, left, etc.. Folding the strip in this manner produces a honeycomb that has a taper in both of two directions so that it can be anchored in the canister.

The canister has a taper which coincides with the taper of the honeycomb.

SUMMARY OF THE INVENTION

The present invention is directed to a catalytic converter provided with a metal foil substrate that has some similarities to the converters described above but differs therefrom in that the converter is of a thin, rectangular construction suitable for location under the floor pan or in other space-restricted location of an automotive vehicle. The intent of the invention is to provide a catalytic converter that is of a relatively small height with a wide cross-section that allows the converter to fit any place under the automobile between the floor pan and the ground.

In the preferred form of the invention, the converter includes a generally rectangular housing enclosing a canister of similar configuration formed of a metal foil and having a top wall, a bottom wall, and a pair of laterally spaced side walls. The top and bottom walls and the sidewalls define a cavity having an inlet end and an outlet end. The canister has a plurality of smooth foil strips arranged in its cavity in substantially perpendicular relationship with the top and bottom walls. The smooth foil strips are spaced from each other so as to form a plurality of substantially rectangular passages for providing a plurality of axially extending flow paths for the exhaust gas emanating from the engine. At least one corrugated foil strip is located in each of the passages provided between the smooth foil strips. In addition, an orthogonal arm portion is integrally formed with each of the smooth foil strips and is located in substantially parallel relationship with the top and bottom walls. Also, a weld is provided for securing the arm of each smooth foil strip and a portion of the corrugated foil in each of the passages to the canister so as to join the top wall to the bottom wall so as to prevent the top wall from moving outwardly relative to the bottom wall when the exhaust gas is flowing through the converter.

Other features and advantages of the present invention will become more apparent from the following detailed description and drawings in which:

BRIEF DESCRIPTION OF THE DRAWINGS

FIG. 2 is an enlarged cross sectional view of the catalytic converter taken on line 2—2 of FIG. 1 showing the construction of the metal foil substrate which forms a part of the converter;

FIG. 3 is an enlarged cross sectional view of the catalytic converter taken on line 3—3 of FIG. 1 showing the manner that the substrate canister is secured to the converter housing;

DETAILED DESCRIPTION OF THE DRAWINGS

Figure 1:
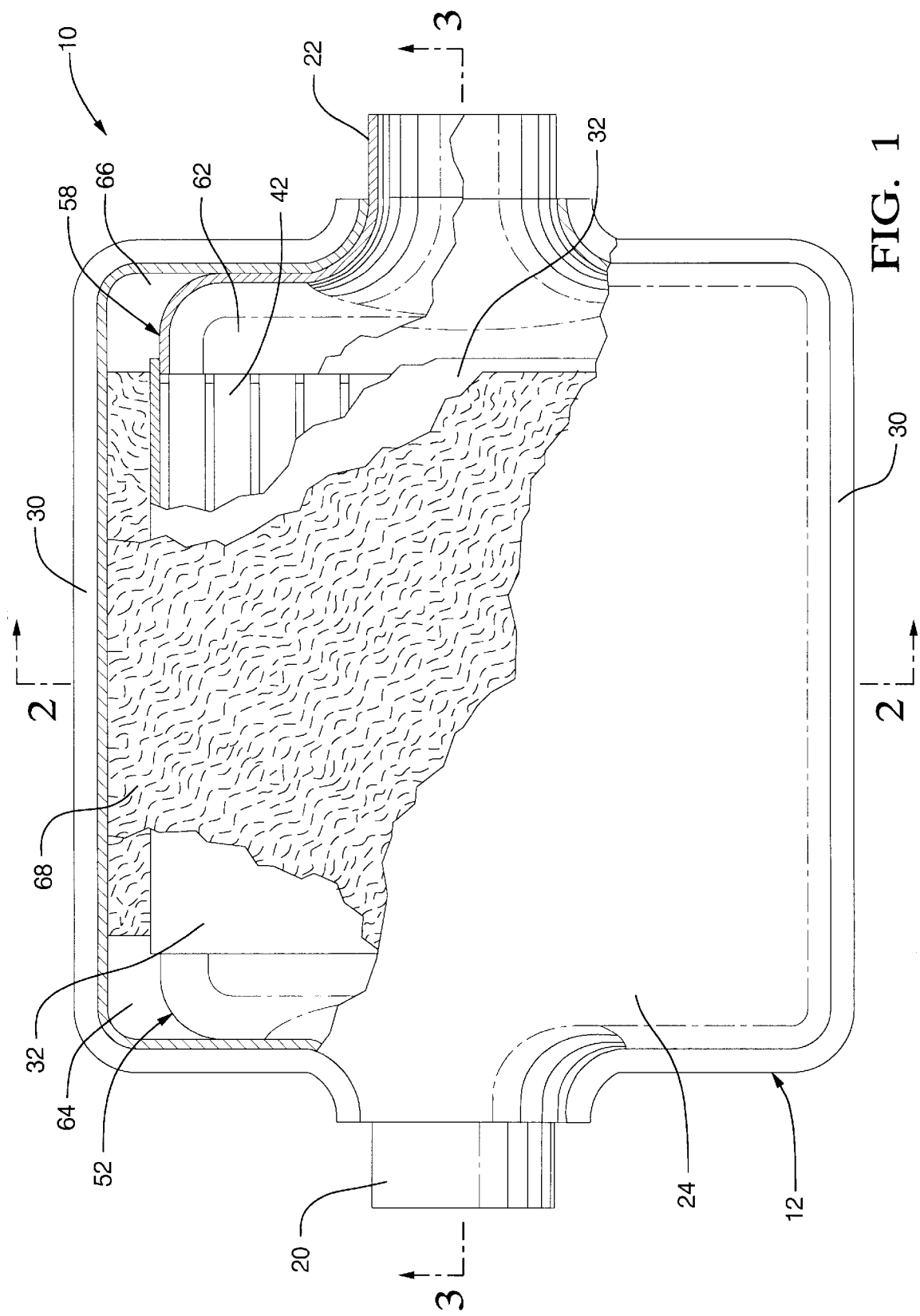
FIG. 1 is a plan view of a catalytic converter made in accordance with the present invention with some of the parts broken away so as to show the interior of the converter.

Referring to the drawings and more particularly FIGS. 1–3 thereof, a catalytic converter 10 made is accordance with the present invention is shown for use in reducing the quantity of undesirable constituents in the exhaust gases of an internal combustion engine. The catalytic converter 10 is provided with a low profile cross-section of rectangular shape for under floor installation and is intended to form a part of the automobile exhaust system. In general, the catalytic converter 10 comprises an outer housing 12 that encloses a catalyst substrate 14. The housing 12 includes a pair of identical sheet metal shells 16 and 18 each formed with semi-cylindrical end sections 20 and 22 and an intermediate U-shaped section 24 as seen in FIG. 2. The U-shaped sections 24 of the shells 16 and 18 conform to the rectangular configuration of the catalyst substrate 14 while the end sections 20 and 22 cooperate to define cylindrical inlet and outlet openings 26 and 28, respectively, for connection in the exhaust system (not shown) of an automobile. Each of the shells 16 and 18 is formed along its opposed outer side edges with an outwardly projecting flange 30 which extends from one end of the shell to the other so that, when the shells 16 and 18 are assembled together to enclose the catalyst substrate 14, the flanges 30 of shell 16 mate with the flanges of shell 18 and are sealingly secured together by edge welding along their entire length.

As best seen in FIGS. 2 and 3, the catalyst substrate 14 includes a generally rectangular canister formed of a metal foil and having a top wall 32, a bottom wall 34, and a pair of laterally spaced sidewalls 36 and 38 which together define a rectangular cavity. As seen in FIG. 2 the height or distance between the top wall 32 and the bottom wall 34 is substantially less than the width or distance between the sidewall 36 and sidewall 38 and preferably will measured between 20 mm and 60 mm. The intent is to provide a substrate in which the width of the substrate is at least three times greater than the height of the substrate 14 and preferably in the range of six to ten times greater than the height. This design then will provide a pan-cake type construction of very low profile for installation under the floor pan of the automobile. When a metal foil substrate has its height and width proportioned as intended in this instance, it should be apparent that, when the substrate is subjected to the pressure of the exhaust gases, the top and bottom walls 32 and 34 of the canister could experience a ballooning outward or an "oil canning" effect unless precautions are taken to prevent the separation of those walls from occurring. As will be more fully described, the present invention contemplates a metal foil substrate 14 having the height to width proportions as indicated above and being able to withstand high exhaust gas pressures without having the top and bottom walls 32 and 34 move outwardly relative to each other.

Figure 4:
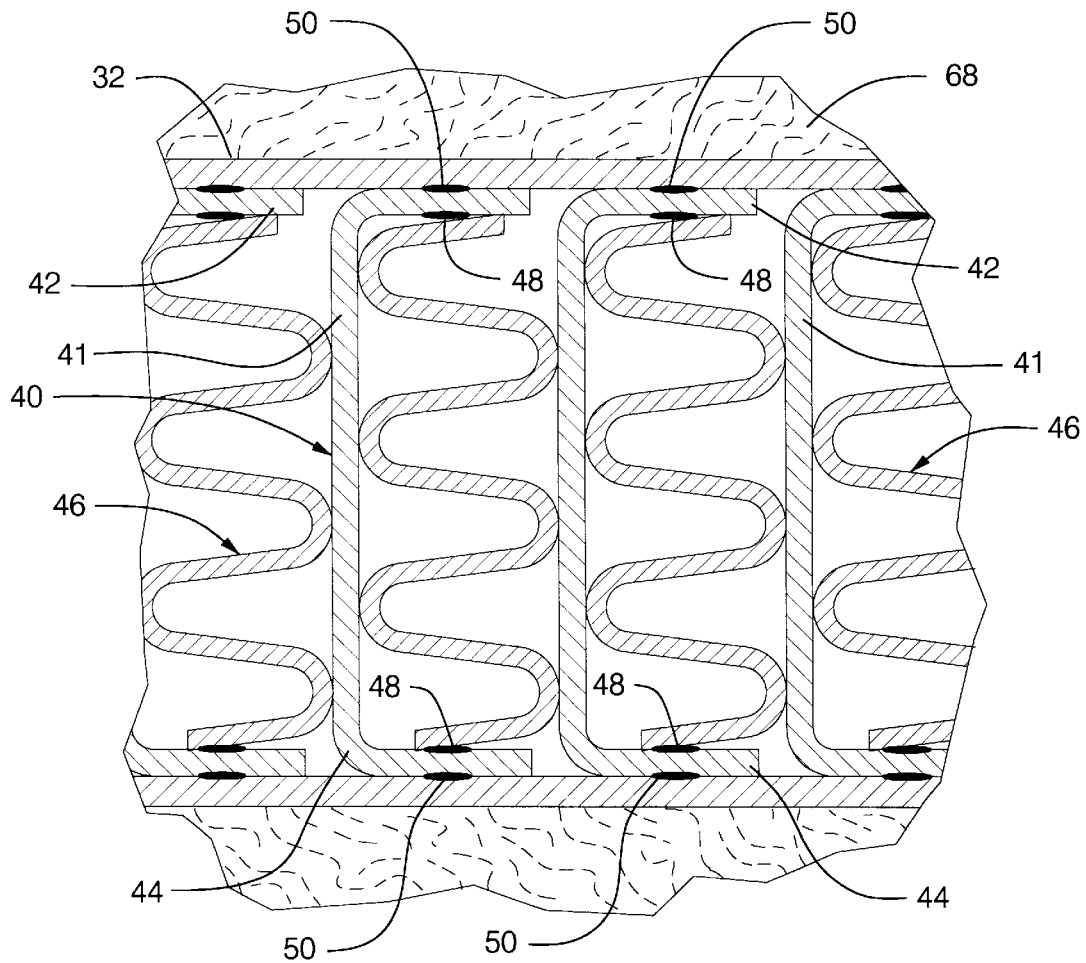
FIG. 4 is a further enlarged view of the circled area seen in FIG. 2 showing the manner that the foil strips are secured to the top and bottom walls of the canister.

More specifically and as seen in FIG. 2, located within the cavity of the canister are a series of identically formed C-shaped smooth foil strips 40, also known as plates, each of which has an upright vertical section 41 integrally formed at its opposed ends, as seen in FIG. 4, with outwardly projecting upper and lower arms 42 and 44. Each of the arms 42 and 44 is at an angle of approximately ninety degrees relative to the vertical section 41. The section 41 of each of the smooth foil strips 40 is positioned in substantially perpendicular relationship with the top and bottom walls 32 and 34 of the canister. As seen in FIG. 3, each of the smooth foil strips 40 has a length corresponding to the length of the canister. Moreover, the smooth foil strips 40 are spaced from each other along the width of the canister as seen in FIG. 2 so as to form a plurality of substantially rectangular passages which 25 provide a plurality of axially extending flow paths for the exhaust gas. Located in each of the passages is a corrugated foil strip 46, also known as a fin, which as seen in FIGS. 2 and 4 has its top and bottom portions secured to the associated arm of the smooth foil strip 40 by a weld 48. In turn, each arm 42 and 44 is secured by a weld 50 to the associated top or bottom wall of the canister. The joining of the top and bottom portions of the each corrugated foil strip 46 together with the associated arms 42 and 44 of the smooth foil strip 40 can be performed by a brazing or welding operation that would provide a continuous weld along the length of the parts as seen in FIG. 3. Thus, in this manner, the top wall 32 and the bottom wall 34 of the canister are joined together to prevent the walls from moving outwardly relative to each other during the operation of the catalytic converter 10. It will be noted that each of the corrugated foil strips 46 is of a length corresponding to the length of the associated smooth foil strip 40 as seen in FIG. 3.

At this juncture it will be noted that each of the foil strips 40 and 46 is typically a thin metal strip measuring one to ten thousands of an inch in thickness and consisting of, by weight, 15–20% chromium, 4–5% aluminum, 0.5% rare earths or yttrium and the balance iron. Foil strips of this type are often designated Fe-Cr-Al-Y and referred to as Fecralloy. Variations of the basic metal foil strip is manufactured by and can be purchased from several companies including Allegheny Ludlum Corporation. In forming the corrugated foil strip 46, the basic metal foil could simply be folded or corrugated with straight undulations perpendicular to the edges of the strip, or it could be first provided with a fine chevron or herringbone pattern, cut to the desired size, and afterwards formed into the sinuous configuration as seen in FIGS. 2 and 4. Both of the foil strips 40 and 46 will have an alumina coating that is impregnated and catalyzed with a precious metal such as platinum, and/or palladium and/or rhodium. The catalyst serves to purify the exhaust gases exiting the internal combustion engine and entering the passages formed in the substrate 14.

As best seen in FIGS. 1 and 3, an inlet end cone 52 is sealingly secured to the front end of the canister and is provided with an inlet opening defined by a cylindrical section 54 located within the cylindrical opening 26 provided by the end sections 20, 20 of the shells 16 and 18. The inlet end cone 52 forms an exhaust gas inlet plenum 56 which serves to directed the exhaust gases into the aforementioned passages of the substrate 14. Similarly, the rear end of the canister is sealingly secured to an outlet end cone 58 provided with an outlet opening defined by a cylindrical section 60 located within the cylindrical outlet opening 28 provided by the end sections 22, 22 of the shells 16 and 18. The outlet end cone 58 forms an exhaust gas outlet plenum 62 through which the treated exhaust gases exit the catalytic converter 10. The end cones 52 and 58 cooperate with the housing 12 to form air chambers 64 and 66 at the opposed ends of the catalytic converter 10 that serve to reduce the temperature of the converter 10 and also serve to block the hot exhaust gases from impinging directly on a mat material 68 located between the substrate 14 and the inner walls of the housing 12 and wrapped around the substrate 14. The mat 68 is a ceramic fiber blanket and serves as an insulating material. A typical example is made by Carborundum Corporation and known by the trademark "Fiberfrax".

Figure 5:
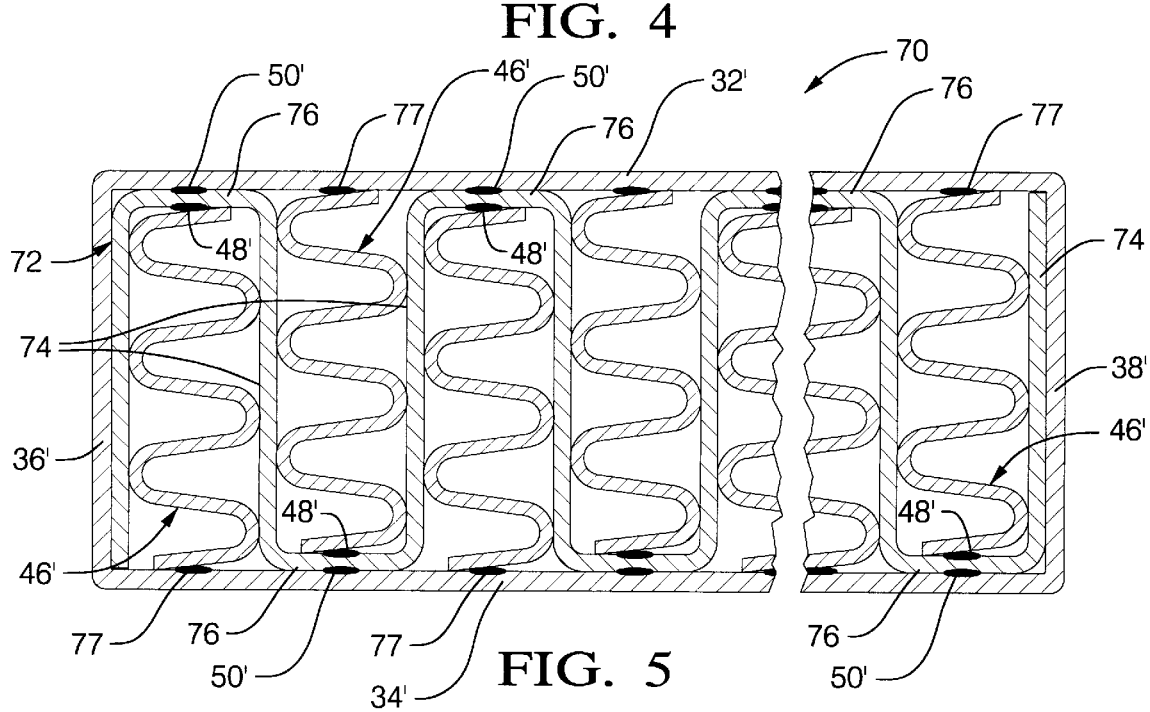
FIG. 5 is a view similar to that of FIG. 2 showing a modified form of the metal foil substrate.

FIG. 5 shows a modified form of the metal foil substrate 14 shown in FIGS. 1–4. It will noted that the parts of the substrate 70 shown in FIG. 5 that are identical to the parts of the substrate 14 of FIGS. 1–4 will be identified by the same reference numerals but primed.

With reference to FIG. 5, the substrate 70 shown includes a canister formed with a top wall 32', a bottom wall 34', and a pair of side walls 36' and 38'. Located within the cavity of the canister is a continuous smooth foil strip 72 which, in this instance, is folded back and forth so as to be sinuous in configuration with the valleys of the foil strip 72 defining a plurality of rectangular passages. Thus, each pair of adjacent vertical 74 sections of the smooth foil strip 72 are positioned substantially perpendicular to the top and bottom walls 32' and 34' and are interconnected at alternating ends by an arm 76 to form the continuous smooth foil strip 72. In addition, each of the arms 76 is located in a plane that is parallel to the plane of the top and bottom walls 32' and 34'. Moreover, each of the valleys of the smooth foil strip 72 is provided with a corrugated foil strip 46' which is identical in design to the corrugated foil strip 46 provided in the substrate 14 shown in FIGS. 1–4. In this case, however, one end only of each corrugated foil strip 46' is secured by a weld 48' to the associated arm 76 of the smooth foil strip 72 and, in turn, the arm 76 is secured by a weld 50' to the associated wall of the canister. The opposite end of the corrugated fin strip 46' is attached directly to the associated wall of the canister by weld 77.

Figure 6:
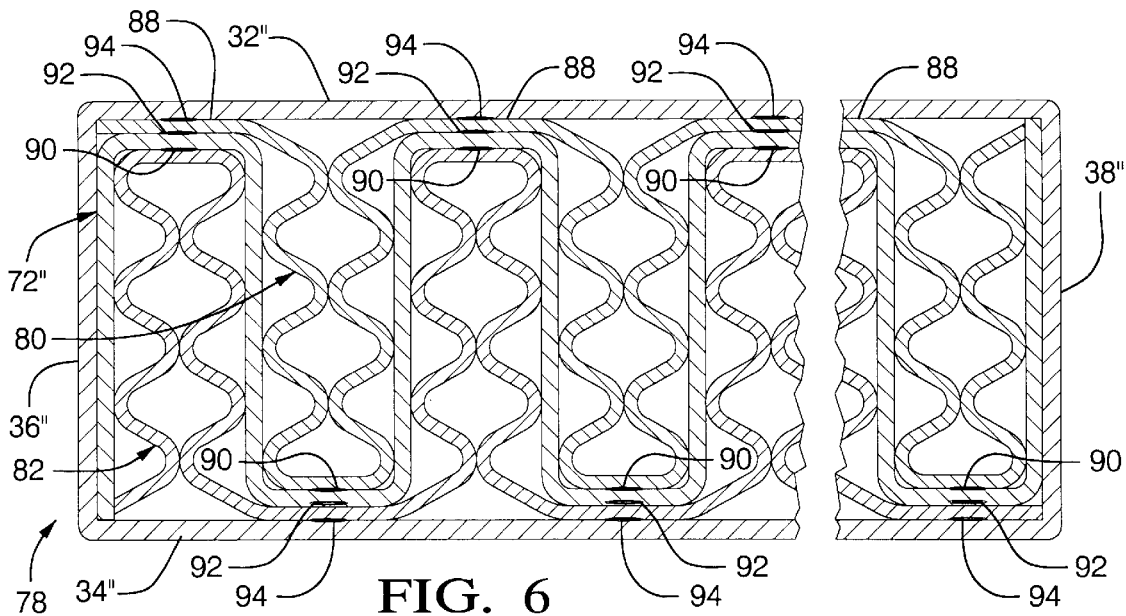
FIG. 6 is a view similar to that of FIG. 2 showing another modified form of the metal foil substrate.
Figure 7:
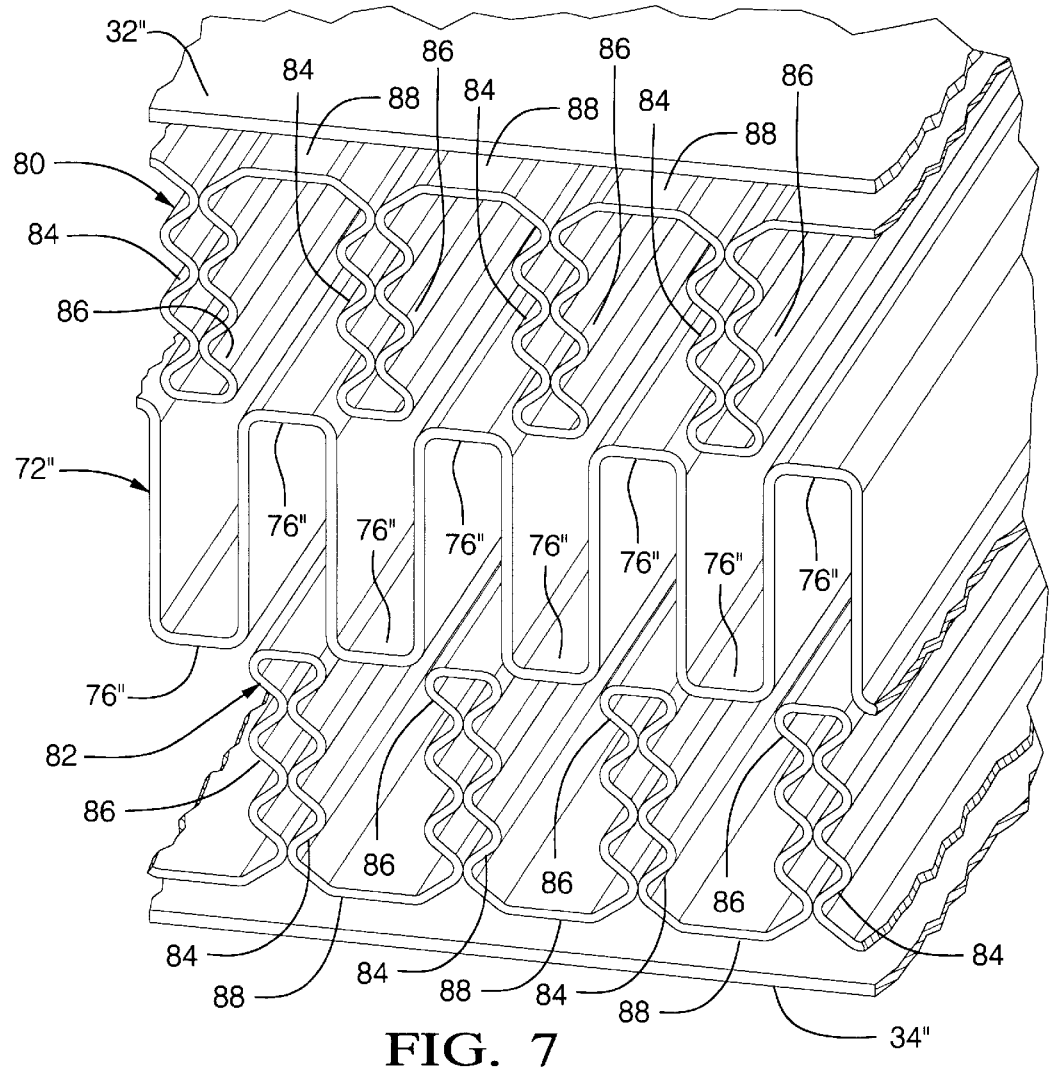
FIG. 7 is an exploded view of the substrate seen in FIG. 6.

FIGS. 6 and 7 show another modified form of the substrates 14 and 70 seen in FIGS. 1–4 and FIG. 5, respectively. In this case, the parts of the substrate 78 in FIGS. 6 and 7 that are identical to the parts of the substrate 70 shown in FIG. 5 will have the same numerals but will be double primed.

As seen in FIG. 6, the canister is provided with a top wall 32", bottom wall 34", and side walls 36" and 38" which together define a rectangular cavity. Within the cavity is located a continuous sinuous shaped smooth foil strip 72" similar to that found in the substrate 70 of FIG. 5. However, rather than having separate and individual corrugated foil strips as seen in the substrate 70 of FIG. 5, the adjacent valleys of the smooth foil strip 72" are combined with a pair of continuous and identical herringbone corrugated foil strips 80 and 82. Each of the corrugated foil strips 80 and 82 is also sinuous in configuration but, in this instance, includes individual corrugated section 84 and 86 in side-by-side no-nesting relationship. Thus, each corrugated section 84 is in close proximity to the other corrugated section 86 and each of the sections 84 and 86 is integrally connected to the adjoining double corrugated sections 84 and 86 by an interconnecting flat bridge section 88. Thus, the double corrugated sections 84 and 86 of the corrugated foil strip 80 are located within alternating valleys on one side of the smooth foil strip 72" and the double corrugated sections 84 and 86 of the corrugated foil strip 82 are located in alternating valleys on the other side of the smooth foil strip 72". In addition, each of the double corrugated sections 84 and 86 of each of the corrugated foil strips 80 and 82 has its folded end welded by a weld 90 to the arm portion 76" of the smooth foil strip 72" which, in turn, is welded by a weld 92 to the associated bridge section 88 and finally welded by a weld 94 to the associated wall of the canister. In this manner, the top wall 32" of the canister is secured to the bottom wall 34" to prevent relative outward movement of the walls 32" when the exhaust gases flow through the substrate.

Various changes and modifications can be made to the above-described catalytic converter without departing from the spirit of the invention. Such changes and modifications are contemplated by the inventors and they do not wish to be limited except by the scope of the appended claims.

What is claimed is:

1. A low profile catalytic converter for use with an internal combustion engine, said catalytic converter including a generally rectangular housing enclosing a canister of similar configuration and having a top wall, a bottom wall, and a pair of laterally spaced side walls, said top and bottom walls and said side walls defining a cavity having an inlet end and an outlet end, said canister having a plurality of smooth foil sections arranged in said cavity in substantially perpendicular relationship with said top and bottom walls, said smooth foil sections being spaced from each other so as to form a plurality of substantially rectangular passages for providing a plurality of axially extending flow paths for the exhaust gas emanating from said engine, at least one corrugated foil strip located in each of said passages provided between said smooth foil sections, an arm integrally formed with each of said smooth foil sections and located in substantially parallel relationship with said top and bottom walls, and separate welds for securing said arm and a portion of said corrugated foil to said canister so as to join said top wall to said bottom wall and thereby prevent said top wall and said bottom wall from moving outwardly relative to each other when said exhaust gas is flowing through said converter.

2. The catalytic converter of claim 1 wherein the cross-sectional width of said canister is at least three times the height of said canister.

3. The catalytic converter of claim 1 wherein said arm projects outwardly from one end of each of said smooth foil sections and cooperates with an additional arm portion projecting outwardly from the other end of each of said smooth foil sections so as to form a smooth foil strip that is C-shaped in cross section.

4. The catalytic converter of claim 1 wherein each of said smooth foil sections is joined by its arm to the adjacent smooth foil section so as to form a smooth foil strip that is a sinuous configuration in cross section.

5. The catalytic converter of claim 4 wherein said smooth foil strip is a continuous strip with the valleys of said smooth foil strip defining said passages and having at least one corrugated foil strip located in each of said valleys.

6. The catalytic converter of claim 4 wherein said smooth foil strip is a continuous strip that is sinuous in configuration and is combined with a pair of sinuous corrugated strips with the valleys on one side of said smooth foil strip having portions of one of said pair of sinuous corrugated strips inserted therein and the valleys on the other side of said smooth foil strip having portions of the other of said pair of sinuous corrugated strips inserted therein.

7. A low profile catalytic converter for use with an internal combustion engine, said catalytic converter including a generally rectangular housing enclosing a canister of similar configuration formed of metal foils and having a top wall, a bottom wall, and a pair of laterally spaced side walls, said top and bottom walls and said side walls defining a cavity having an inlet end and an outlet end, an inlet cone secured to said inlet end of said canister and forming an exhaust gas inlet plenum therewith, an outlet cone secured to said outlet end of said canister and forming an exhaust gas outlet plenum therewith, said canister having a plurality of smooth foil sections arranged in said cavity in substantially perpendicular relationship with said top and bottom walls, said smooth foil sections being spaced from each other so as to form a plurality of substantially rectangular passages for providing a plurality of axially extending flow paths for the exhaust gas emanating from said engine, at least one corrugated foil strip located in each of said passages provided between said smooth foil sections, an arm integrally formed with each of said smooth foil sections and located in substantially parallel relationship with said top and bottom walls, and separate welds for securing said arm and a portion of said corrugated foil in each of said passages to said canister so as to join said top wall to said bottom wall located between said inlet cone and said outlet cone and thereby prevent said top wall and said bottom wall from moving outwardly relative to each other when said exhaust gas is flowing through said converter.

8. The catalytic converter of claim 7 wherein the cross-sectional width of said canister is at least three times the height of said canister.

9. The catalytic converter of claim 7 wherein said arm projects outwardly from one end of each of said smooth foil sections and cooperates with an additional arm portion projecting outwardly from the other end of each of said smooth foil sections so as to form a smooth foil strip that is C-shaped in cross section.

10. The catalytic converter of claim 7 wherein each of said smooth foil sections is joined by its arm to the adjacent smooth foil section so as to form a smooth foil strip that has a sinuous configuration in cross section.

11. The catalytic converter of claim 10 wherein said smooth foil strip is a continuous strip with the valleys of said smooth foil strip defining said passages and having a corrugated foil strip located in each of said valleys.

12. The catalytic converter of claim 10 wherein said smooth foil strip is a continuous strip that is sinuous in configuration and is combined with a pair of sinuous herringbone corrugated strips with the valleys on one side of said smooth foil strip having portions of one of said pair of sinuous herringbone corrugated strips inserted therein and the valleys on the other side of said smooth foil strip having portions of the other of said pair of sinuous herringbone corrugated strips inserted therein.

13. A low profile catalytic converter for use with an internal combustion engine, said catalytic converter including a generally rectangular housing enclosing a canister of similar configuration formed of metal foils and having a top wall, a bottom wall, and a pair of laterally spaced side walls, said top and bottom walls and said side walls defining a cavity having an inlet end and an outlet end, an inlet cone secured to said inlet end of said canister and forming an exhaust gas inlet plenum therewith, an outlet cone secured to said outlet end of said canister and forming an exhaust gas outlet plenum therewith, said canister having a plurality of smooth foil sections arranged in said cavity in substantially perpendicular relationship with said top and bottom walls, said smooth foil sections being spaced from each other so as to form a plurality of substantially rectangular passages for providing a plurality of axially extending flow paths for the exhaust gas emanating from said engine, a pair of side-by-side non-nesting herringbone corrugated foil sections located in each of said passages provided between said smooth foil sections, an arm integrally formed with each of said smooth foil sections and located in substantially parallel relationship with said top and bottom walls, a bridge section interconnecting adjacent pairs of said corrugated sections, and separate welds for securing said arm, said bridge section and a portion of said corrugated foil sections in each of said passages to said canister so as to join said top wall to said bottom wall located between said inlet cone and said outlet cone and thereby prevent said top wall and said bottom wall from moving outwardly relative to each other when said exhaust gas is flowing through said converter.

\* \* \* \* \*